United States Patent
Mukhopadhyay et al.

(10) Patent No.: US 10,119,471 B2
(45) Date of Patent: Nov. 6, 2018

(54) TURBINE ENGINE ASSEMBLY AND METHOD OF OPERATING THEREOF

(71) Applicant: General Electric Company, Schenectady, NY (US)

(72) Inventors: Debabrata Mukhopadhyay, Bangalore (IN); Pugalenthi Nandagopal, Bangalore (IN); James Adaickalasamy, Bangalore (IN)

(73) Assignee: General Electric Company, Schenectady, NY (US)

( * ) Notice: Subject to any disclaimer, the term of this patent is extended or adjusted under 35 U.S.C. 154(b) by 389 days.

(21) Appl. No.: 14/879,470

(22) Filed: Oct. 9, 2015

(65) Prior Publication Data

US 2017/0101933 A1 Apr. 13, 2017

(51) Int. Cl.
| | | |
|---|---|---|
| F01D 11/24 | (2006.01) | |
| F01K 23/10 | (2006.01) | |
| F02C 3/04 | (2006.01) | |
| F02C 7/14 | (2006.01) | |
| F02C 7/18 | (2006.01) | |

(52) U.S. Cl.
CPC .............. *F02C 7/185* (2013.01); *F01D 11/24* (2013.01); *F01K 23/10* (2013.01); *F02C 3/04* (2013.01); *F02C 7/14* (2013.01); *F05D 2220/32* (2013.01); *F05D 2220/72* (2013.01); *F05D 2260/213* (2013.01)

(58) Field of Classification Search
CPC .. F01D 11/24; F01K 23/10; F02C 7/10; F02C 7/14; F02C 7/141; F02C 7/143; F02C 7/1435; F02C 7/18; F02C 7/185; F05D 2260/205
See application file for complete search history.

(56) References Cited

U.S. PATENT DOCUMENTS

| | | | | |
|---|---|---|---|---|
| 5,697,208 A | * | 12/1997 | Glezer | ................... F01D 5/022 60/785 |
| 5,782,080 A | | 7/1998 | Illbruck | |
| 6,892,523 B2 | | 5/2005 | Fetescu et al. | |
| 8,033,116 B2 | * | 10/2011 | Sengar | ..................... F02C 6/08 60/39.53 |

(Continued)

FOREIGN PATENT DOCUMENTS

| | | |
|---|---|---|
| EP | 0 379 880 A1 | 8/1990 |
| EP | 2 418 367 A1 | 2/2012 |

OTHER PUBLICATIONS

Extended European Search Report and Opinion issued in connection with corresponding EP Application No. 16192762.9 dated Mar. 7, 2017.

*Primary Examiner* — Logan Kraft
*Assistant Examiner* — Christopher R Legendre
(74) *Attorney, Agent, or Firm* — Armstrong Teasdale LLP

(57) ABSTRACT

A turbine engine assembly is provided. The assembly includes a compressor, and an air duct coupled in flow communication with the compressor. The air duct is configured to channel a flow of bleed air from the compressor therethrough. The assembly also includes a fluid supply system coupled in flow communication with the air duct, wherein the fluid supply system is configured to channel a flow of fluid towards the air duct to modify a temperature of the bleed air based on an operating condition of the turbine engine assembly.

20 Claims, 4 Drawing Sheets

(56) References Cited

U.S. PATENT DOCUMENTS

| | | | |
|---|---|---|---|
| 8,707,709 B2* | 4/2014 | Davis, Jr. | F02C 7/16 |
| | | | 60/266 |
| 9,115,595 B2* | 8/2015 | Snook | F01D 11/24 |
| 2001/0015059 A1 | 8/2001 | Fetescu et al. | |
| 2004/0206064 A1 | 10/2004 | Reiter et al. | |
| 2013/0036747 A1 | 2/2013 | Fuchs et al. | |
| 2013/0266418 A1* | 10/2013 | Snook | F01D 11/24 |
| | | | 415/1 |
| 2017/0101933 A1* | 4/2017 | Mukhopadhyay | F02C 7/185 |

* cited by examiner

TURBINE ENGINE ASSEMBLY AND METHOD OF OPERATING THEREOF

BACKGROUND

The present disclosure relates generally to turbine engines and, more specifically, to systems and methods for conditioning compressor bleed air.

At least some known gas turbine engines include at least one compressor, a combustor, and a high-pressure turbine coupled together in a serial flow relationship. More specifically, the compressor and high-pressure turbine are coupled through a shaft to form a high-pressure rotor assembly. Air entering the turbine engine is mixed with fuel and ignited to form a high energy gas stream. The high energy gas stream flows through the high-pressure turbine to rotatably drive the high-pressure turbine such that the shaft rotatably drives the compressor. After being discharged from the high-pressure turbine, the gas stream continues to expand as it flows through a low-pressure turbine positioned aft of the high-pressure turbine. The low-pressure turbine includes a rotor assembly coupled to a drive shaft and a fan. The low-pressure turbine rotatably drives the fan through the drive shaft. In some embodiments, the gas stream discharged from the turbines is channeled through a heat recovery steam generator. As such, hot steam is produced, and the steam is channeled through a steam turbine assembly for further producing power.

Many modern commercial turbine engines operate at increasingly high temperatures to facilitate increasing engine performance and efficiency. However, operating at the increasingly high temperatures can result in damage to hot gas path components over extended periods of operation. As such, at least some known turbine engines include an active cooling system that facilitates reducing a temperature of hot gas path components. For example, the hot gas path components are typically cooled with a flow of compressor bleed air discharged from the high-pressure compressor. In some applications, the compressor bleed air is cooled prior to being channeled towards the hot gas path components for cooling purposes. However, bleeding large amounts of bypass air from the compressor can result in a reduction in overall engine efficiency.

BRIEF DESCRIPTION

In one aspect, a turbine engine assembly is provided. The assembly includes a compressor, and an air duct coupled in flow communication with the compressor. The air duct is configured to channel a flow of bleed air from the compressor therethrough. The assembly also includes a fluid supply system coupled in flow communication with the air duct, wherein the fluid supply system is configured to channel a flow of fluid towards the air duct to modify a temperature of the bleed air based on an operating condition of the turbine engine assembly.

In another aspect, a system for use in cooling compressor bleed air in a turbine engine assembly comprising a compressor is provided. The system includes an air duct coupled in flow communication with the compressor. The air duct is configured to channel a flow of bleed air from the compressor therethrough. The system also includes a fluid supply system coupled in flow communication with the air duct, wherein the fluid supply system is configured to channel a flow of fluid towards the air duct to modify a temperature of the bleed air based on an operating condition of the turbine engine assembly.

In yet another aspect, a method of operating a turbine engine assembly is provided. The method includes channeling a flow of fluid towards an air duct that channels a flow of bleed air therethrough, and at least one of injecting the flow of fluid into the air duct or discharging the flow of fluid onto an exterior surface of the air duct such that a temperature of the bleed air is modified based on an operating condition of the turbine engine assembly.

DETAILED DESCRIPTION

Embodiments of the present disclosure relate to turbine engine assemblies including a system for use in modifying the temperature of compressor bleed air. More specifically, the turbine engine assemblies described herein include a heat exchanger that transfers heat between compressor bleed air and one or more sources of fluid having a temperature that is either greater than or less than a temperature of the compressor bleed air. For example, cooling the compressor bleed air facilitates reducing the amount of bleed air required for cooling one or more hot gas path components in a turbine section of a gas turbine. In addition, heating the compressor bleed air enables the heated bleed air to reduce a thermal gradient between rotating and stationary components in a gas turbine that either increase or decrease in temperature at different rates when the gas turbine is in a transient operating condition. As such, embodiments of the present disclosure provide thermal management benefits for the turbine casing and hot gas path components, and reduce compressor bleed flow based on the operating condition of a turbine engine assembly. The embodiments described herein also provide the capability to manage thermal growth of the inner and outer turbine casing, thereby providing reduced blade tip clearance for the turbine assemblies in the turbine engine.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Figure 1:
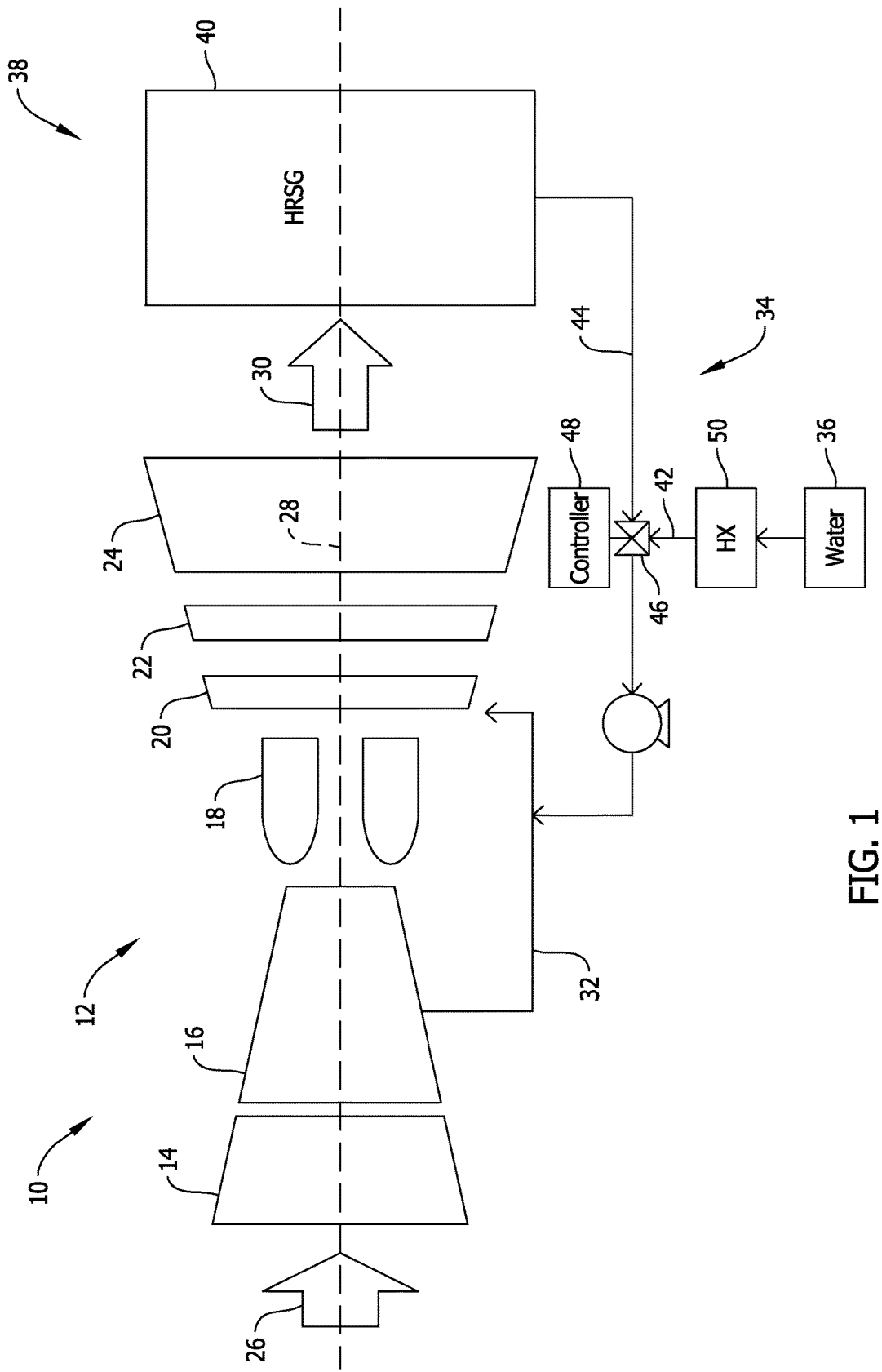
FIG. 1 is a schematic illustration of an exemplary turbine engine assembly.

FIG. 1 is a schematic illustration of an exemplary turbine engine assembly 10. In the exemplary embodiment, turbine engine assembly 10 includes a gas turbine engine 12 that includes a low pressure compressor 14, a high pressure compressor 16, and a combustor assembly 18 positioned downstream from high pressure compressor 16. Gas turbine engine 12 also includes a high pressure turbine 20 positioned downstream from combustor assembly 18, a low pressure turbine 22 positioned downstream from high pressure turbine 20, and a power turbine 24 positioned downstream from low pressure turbine 22.

In operation, a flow of intake air 26 is channeled through low pressure compressor 14 and a flow of compressed air is channeled from low pressure compressor 14 to high pressure compressor 16. The compressed air is discharged from high pressure compressor 16 and channeled towards combustor assembly 18, where the air is mixed with fuel and combusted to form a flow of combusted gas discharged towards high pressure turbine 20. The flow of combusted gas discharged from combustor assembly 18 drives high pressure turbine 20 about a centerline 28 of gas turbine engine 12, and the flow of combusted gas is channeled through turbines 20 and 22 and then discharged from gas turbine engine 12 in the form of a flow of exhaust gas 30.

Turbine engine assembly 10 also includes an air duct 32 coupled in flow communication with high pressure compressor 16 and configured to channel a flow of compressor bleed air towards turbines 20 and 22. As will be described in more detail below, the compressor bleed air is channeled towards turbines 20 and 22, for example, to provide thermal management for turbine casings and hot gas path components therein. As used herein, "hot gas path" refers to a flow path for combusted gas within gas turbine engine 12, and "hot gas path component" refers to any component that contacts the combusted gas within the hot gas path. In an alternative embodiment, the compressor bleed air can also be used for other cooling and/or heating purposes. For example, the bleed air can be used to purge fluid within the wheelspace of a rotor assembly.

In the exemplary embodiment, turbine engine assembly 10 includes a fluid supply system 34 coupled in flow communication with air duct 32. Fluid supply system 34 channels a flow of fluid towards air duct 32 to modify a temperature of the bleed air based on an operating condition of turbine engine assembly 10. More specifically, at least one of the type of fluid or the temperature of the fluid is selected based on the operating condition of gas turbine engine 12.

For example, in one embodiment, fluid supply system 34 includes a source of water 36 and a source of steam 38 embodied as a heat recovery steam generator (HRSG) 40. HRSG 40 is positioned downstream from gas turbine engine 12 for recovering waste heat from exhaust gas 30. As such, a water line 42 and a steam line 44 channel flows of fluid towards a control valve 46. A controller 48 is coupled in communication with control valve 46, and is operable such that one of water or steam can be selectively channeled towards air duct 32. In an alternative embodiment, steam may be supplied from any source that enables fluid supply system 34 to function as described herein.

In one embodiment, controller 48 is capable of monitoring blade tip clearance in high-pressure turbine 20, and capable of adjusting the mass flow rate and temperature of fluid channeled through lines 42 and 44 based on clearance data, engine output data, and the temperature of compressor bleed air.

As described above, at least one of the type of fluid or the temperature of the fluid channeled towards air duct 32 is selected based on the operating condition of gas turbine engine 12. More specifically, the selection is based on whether the bleed air channeled through air duct 32 is to be either cooled or heated before being channeled towards turbines 20 and 22. Cooling the flow of bleed air improves the cooling efficiency of the bleed air when used for clearance control between stationary and rotating components within gas turbine engine 12 at steady state operating conditions, for example. Cooling the flow of bleed air also facilitates reducing the amount of air required to be bled from compressor 16, as mentioned above. Moreover, fluid supply system 34 provides the option of heating the flow of bleed air such that stationary and rotating components within gas turbine engine 12 increase or decrease in temperature at a similar rate during transient operating conditions.

In one embodiment, fluid supply system 34 channels fluid having a temperature less than a predetermined threshold towards air duct 32 when gas turbine engine 12 is in a steady state operating condition or producing a predetermined power output, and channels fluid having a temperature greater than the predetermined threshold towards air duct 32 when gas turbine engine 12 is in a transient operating condition. Even more specifically, fluid supply system 34 channels fluid having a temperature less than the predetermined threshold when gas turbine engine 12 is operating at greater than a predetermined load percentage threshold, and channels fluid having a temperature greater than the predetermined threshold when gas turbine engine 12 is operating at less than the predetermined load percentage threshold. In one embodiment, the predetermined load percentage threshold is defined within a range between about 80 percent and about 90 percent of base load operation.

When cooling the flow of bleed air, fluid supply system 34 channels either water or steam having a temperature below the predetermined threshold from either the source of water 36 or the source of steam 38 towards air duct 32. In one embodiment, a heat exchange device 50 is positioned between the source of water 36 and air duct 32. Heat exchange device 50 preheats the water discharged from the source of water 36. Preheating the water facilitates reducing thermal stress on comparatively hot components, such as air duct 32, when contacted by the water. Alternatively, any suitable heating system may be used to preheat the water channeled towards air duct 32.

When heating the flow of bleed air, fluid supply system 34 channels steam having a temperature greater than the predetermined threshold from the source of steam 38 towards air duct 32. In an alternative embodiment, water or steam having a temperature below the predetermined threshold may be channeled towards air duct 32 and provided with additional heat such that the water or steam has a temperature greater than the predetermined threshold. The additional heat may be provided by sources such as, but not limited to, waste heat from gas turbine engine 12 including heat from exhaust gas 30 or heat from bearing lube oil.

Figure 2:
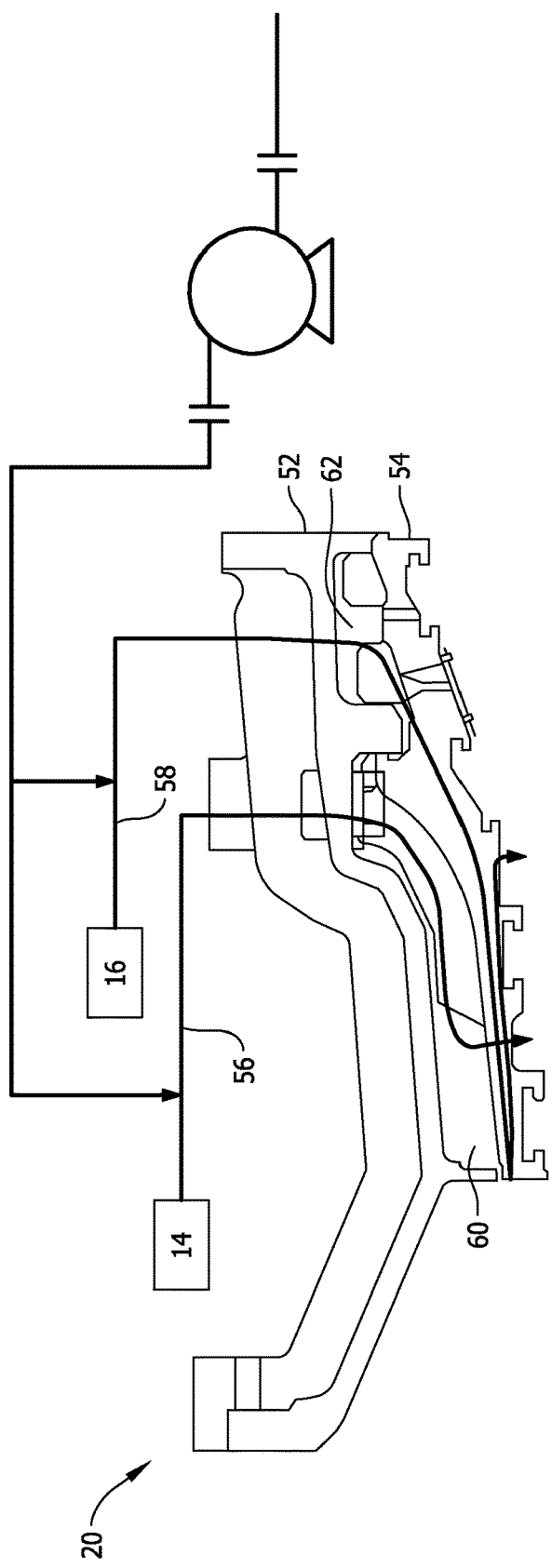
FIG. 2 is a cross-sectional view of a portion of a high pressure turbine that may be used with the turbine engine assembly shown in FIG. 1.

FIG. 2 is a cross-sectional view of a portion of high pressure turbine 20 that may be used with turbine engine assembly 10 (shown in FIG. 1). In the exemplary embodiment, turbine 20 includes an outer turbine casing 52 and an inner turbine casing 54 positioned radially inward from outer turbine casing 52. A first air duct 56 channels a first portion of bleed air from compressor 16, and a second air duct 58 channels a second portion of bleed air from compressor 16. The bleed air in the first portion is generally hotter than the second portion as a result of being bled from a later stage of compressor 16. As such, the first portion of bleed air is channeled through a first plenum 60 defined between casings 52 and 54 before being used for thermal management of a first nozzle (not shown) within turbine 20. Likewise, the second portion of bleed air is channeled through a second plenum 62 defined between casings 52 and 54 and used for thermal management of inner turbine casing 54 and a second nozzle (not shown) within turbine 20.

As described above, fluid supply system 34 channels a flow of fluid towards air duct 32 to modify a temperature of the bleed air channeled therethrough. As will be described in more detail below, fluid supply system 34 either injects the flow of fluid into air ducts 56 and 58 such that the flow of fluid and the flow of bleed air are mixed therein, or the flow of fluid is discharged onto an exterior surface of air ducts 56 and 58 to facilitate transferring heat therebetween.

Figure 3:
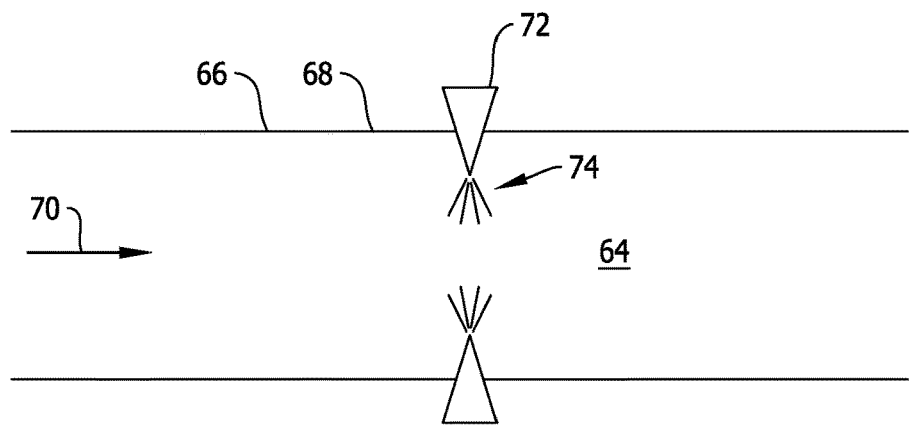
FIG. 3 is a cross-sectional view of an air duct that may be used with the turbine engine assembly shown in FIG. 1 in accordance with a first embodiment of the disclosure.
Figure 4:
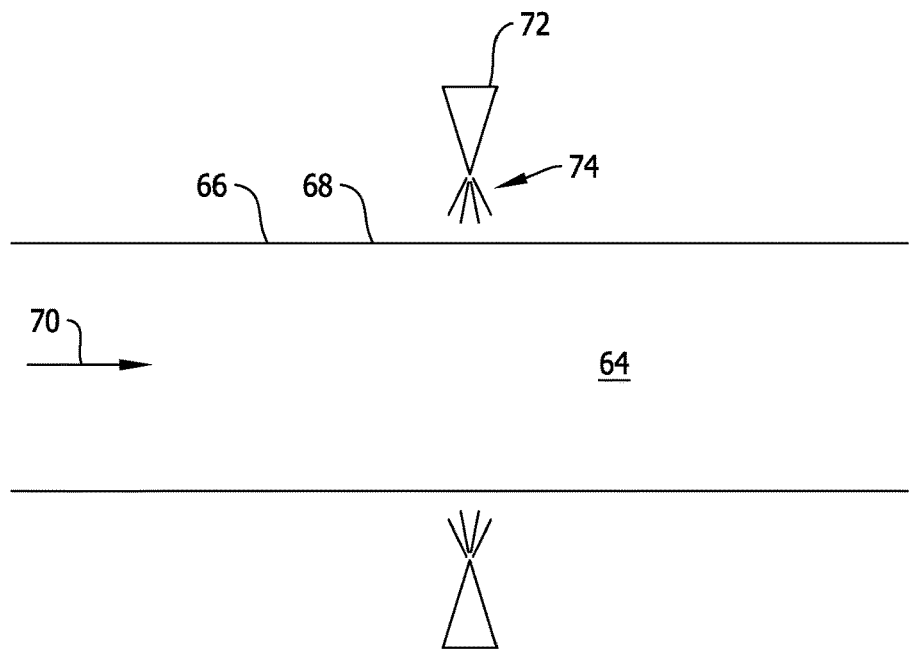
FIG. 4 is a cross-sectional view of an air duct that may be used with the turbine engine assembly shown in FIG. 1 in accordance with a second embodiment of the disclosure.
Figure 5:
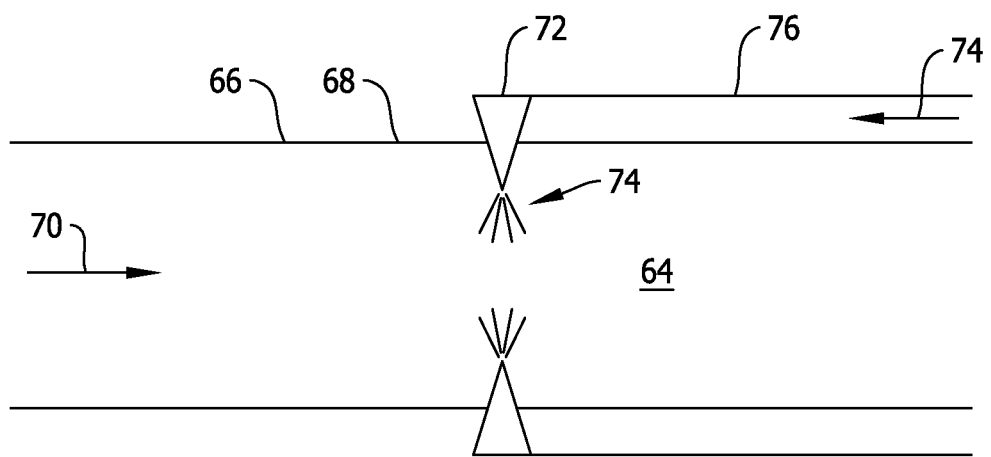
FIG. 5 is a cross-sectional view of an air duct that may be used with the turbine engine assembly shown in FIG. 1 in accordance with a third embodiment of the disclosure.

FIGS. 3-5 are cross-sectional views of air duct 32 that may be used with turbine engine assembly 10 (shown in FIG. 1) in accordance with first, second, and third embodiments of the disclosure. Referring to FIG. 3, air duct 32 includes an interior 64 defined by side walls 66, and side walls 66 include an exterior surface 68. The flow of bleed air 70 is channeled through interior 64 of air duct 32.

Moreover, in the exemplary embodiment, fluid supply system 34 (shown in FIG. 1) includes at least one nozzle 72 for discharging a flow of fluid 74 therefrom. More specifically, at least a portion of nozzle 72 extends through side walls 66 of air duct 32 for injecting the flow of fluid 74 into air duct 32. As such, the temperature of the flow of bleed air 70 is modified when the flow of fluid 74 and the flow of bleed air 70 are mixed within air duct 32.

Referring to FIG. 4, at least one nozzle 72 is positioned a distance from exterior surface 68 of air duct 32. Nozzle 72 discharges the flow of fluid 74 therefrom onto exterior surface 68 of air duct 32. Heat is transferred between the flow of fluid 74 and air duct 32, which facilitates modifying the temperature of the flow of bleed air 70 via the thermal conductivity of side walls 66.

Referring to FIG. 5, fluid supply system 34 includes an outer jacket 76 extending along and positioned radially outward from side walls 66 of air duct 32. As described above, in one embodiment, the flow of fluid is preheated to facilitate reducing thermal stress on hot components, such as air duct 32, when there is a comparatively extreme temperature difference between the hot components and fluid to be used for cooling purposes. In the exemplary embodiment, the flow of fluid 74 is channeled through outer jacket 76 prior to being injected into air duct 32. As such, the temperature of the flow of fluid 74 is progressively increased as the flow of fluid 74 is channeled from the source of fluid towards nozzle 72.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:
1. A turbine engine assembly comprising:
a compressor;
an air duct coupled in flow communication with said compressor, said air duct configured to channel a flow of bleed air from said compressor therethrough; and
a fluid supply system coupled in flow communication with said air duct, wherein said fluid supply system comprises:
a control valve in upstream flow communication with said air duct;
a water line coupled in upstream flow communication with said control valve and configured to channel a flow of water towards said control valve;
a steam line coupled in upstream flow communication with said control valve and configured to channel a flow of steam toward said control valve; and
a controller operably coupled to said control valve, said controller operable to selectively channel the flow of water and the flow of steam downstream from said control valve as a flow of fluid towards said air duct to selectively (i) reduce a temperature of the flow of bleed air in said air duct during a steady state operating condition of the turbine engine assembly, and (ii) increase a temperature of the flow of bleed air in said air duct during a transient operating condition of the turbine engine assembly.

2. The assembly in accordance with claim 1, wherein said fluid supply system comprises a source of water coupled in upstream flow communication with said water line and a source of steam coupled in upstream flow communication with said steam line.

3. The assembly in accordance with claim 1, wherein said fluid supply system comprises a heat exchange device coupled in flow communication with said water line upstream from said control valve, said heat exchange device configured to preheat the flow of water.

4. The assembly in accordance with claim 1, wherein said controller is selectively operable to channel the flow of fluid having a temperature (i) less than a predetermined threshold towards said air duct when the turbine engine assembly is in the steady state operating condition, and (ii) greater than the predetermined threshold towards said air duct when the turbine engine assembly is in the transient operating condition.

5. The assembly in accordance with claim 4, wherein said controller is selectively operable to channel the flow of fluid having a temperature (i) less than the predetermined threshold towards said air duct when the turbine engine assembly is operating at greater than a predetermined load percentage threshold, and (ii) greater than the predetermined threshold towards said air duct when the turbine engine assembly is operating at less than the predetermined load percentage threshold.

6. The assembly in accordance with claim 1, wherein said fluid supply system comprises at least one nozzle configured to inject the flow of fluid into said air duct such that the flow of fluid and the flow of bleed air are mixed within said air duct.

7. The assembly in accordance with claim 1, wherein said fluid supply system comprises at least one nozzle configured to discharge the flow of fluid onto an exterior surface of said air duct.

8. The assembly in accordance with claim 1 further comprising a turbine positioned downstream from said compressor, said turbine comprising at least one hot gas path component configured to receive the flow of bleed air discharged from said air duct.

9. A system for use in cooling modifying a temperature of compressor bleed air in a turbine engine assembly comprising a compressor, said system comprising:
an air duct coupled in flow communication with the compressor, said air duct configured to channel the compressor bleed air from the compressor therethrough; and a fluid supply system coupled in flow communication with said air duct, wherein said fluid supply system comprises:
  a control valve in upstream flow communication with said air duct;
  a water line coupled in upstream flow communication with said control valve and configured to channel a flow of fluid water towards said air duct control valve;
  a steam line coupled in upstream flow communication with said control valve and configured to channel a flow of steam toward said control valve; and
  a controller operably coupled to said control valve, said controller operable to selectively channel the flow of water and the flow of steam downstream from said control valve as a flow of fluid towards said air duct to selectively (i) reduce a temperature of the compressor bleed air in said air duct during a steady state operating condition of the turbine engine assembly, and (ii) increase a temperature of the compressor bleed air in said air duct during a transient operating condition of the turbine engine assembly.

10. The system in accordance with claim 9, wherein said fluid supply system comprises a source of water coupled in upstream flow communication with said water line and a source of steam coupled in upstream flow communication with said steam line.

11. The system in accordance with claim 9, wherein said fluid supply system comprises a heat exchange device coupled in flow communication with said water line upstream from said control valve, said heat exchange device configured to preheat the flow of water.

12. The system in accordance with claim 9, wherein said controller is selectively operable to channel fluid the flow of fluid having a temperature (i) less than a predetermined threshold towards said air duct when the turbine engine assembly is in the steady state operating condition, and (ii) greater than the predetermined threshold towards said air duct when the turbine engine assembly is in the transient operating condition.

13. The system in accordance with claim 12, wherein said controller is selectively operable to channel the flow of fluid having a temperature (i) less than the predetermined threshold towards said air duct when the turbine engine assembly is operating at greater than a predetermined load percentage threshold, and (ii) greater than the predetermined threshold towards said air duct when the turbine engine assembly is operating at less than the predetermined load percentage threshold.

14. The system in accordance with claim 9, wherein said fluid supply system comprises at least one nozzle configured to inject the flow of fluid into said air duct such that the flow of fluid and the compressor bleed air are mixed within said air duct.

15. The system in accordance with claim 9, wherein said fluid supply system comprises at least one nozzle configured to discharge the flow of fluid onto an exterior surface of said air duct.

16. A method of operating a turbine engine assembly, said method comprising:
  channeling a flow of bleed air from a compressor of the turbine engine assembly into an air duct;
  channeling a flow of water into a water line coupled in upstream flow communication with a control valve;
  channeling a flow of steam into a steam line coupled in upstream flow communication with the control valve; and
  selectively channeling the flow of water and the flow of steam downstream from the control valve as a flow of fluid towards the air duct such that a temperature of the flow of bleed air in the air duct is selectively (i) reduced during a steady state operating condition of the turbine engine assembly and (ii) increased during a transient operating condition of the turbine engine assembly.

17. The method in accordance with claim 16 further comprising discharging the flow of bleed air from the air duct towards at least one hot gas path component within the turbine engine assembly.

18. The method in accordance with claim 16, further comprising at least one of injecting the flow of fluid into the air duct and discharging the flow of fluid onto an exterior surface of the air duct.

19. The method in accordance with claim 18 further comprising preheating the flow of water upstream from the control valve.

20. The method in accordance with claim 16, wherein said channeling the flow of steam comprises channeling the flow of steam from a source of steam that includes a heat recovery steam generator.

* * * * *